May 28, 1929.  J. H. DALBEY  1,714,710
TIRE FILLER
Filed Sept. 13, 1926
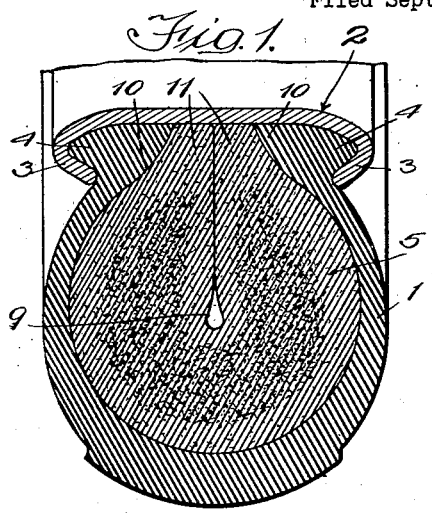
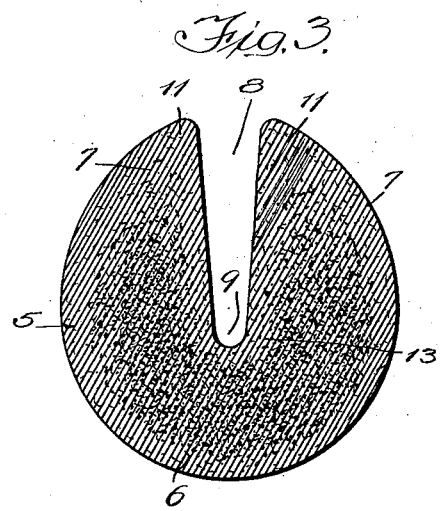
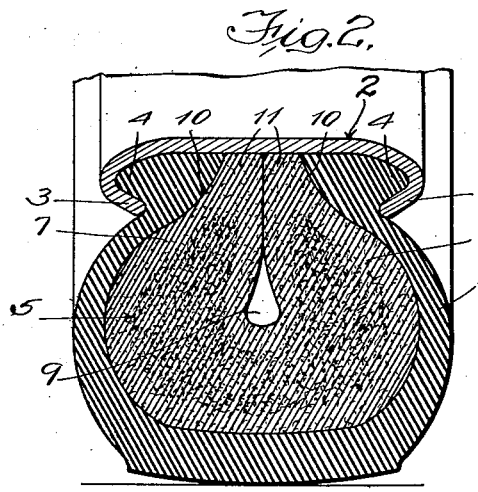
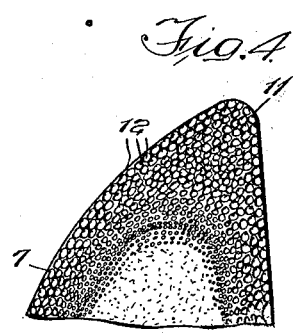
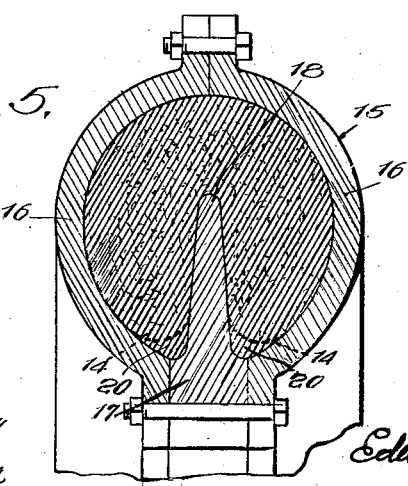
Witnesses:
William P. Kilroy
Harry R. L. White
Inventor:
James H. Dalbey
By Edward Fay Wilson
Atty Patented May 28, 1929.

1,714,710

UNITED STATES PATENT OFFICE.

JAMES H. DALBEY, OF ELGIN, ILLINOIS.

TIRE FILLER.

Application filed September 13, 1926. Serial No. 135,168.

This invention relates to improvements in fillers, for pneumatic tire casings, which in use simulate the well known air tubes but which are not subject to puncture or collapse.

This present invention has to do primarily with the production of a spongy rubber filler in which the density of the material is so varied, or, in other words, the material is so distributed that the filler is easier to install, which is less liable to break down or disintegrate under the strains and distortions in use, and which is therefore more durable than fillers heretofore made.

It is well known to make a yielding filler core or body which is adapted to be compressed within an ordinary pneumatic tire casing and so arranged that when installed it shall be compressed to a suitable extent to properly sustain the imposed load. Such cores or fillers are usually made of spongy rubber of a cross-sectional form or section adapted to properly fit within the casing to be filled and long enough to completely fill the casing. Some forms of such cores have V-shaped slots along their inner sides which are adapted to be closed when the core is compressed within a casing.

Heretofore, so far as I am aware, the cores have been made of substantially uniform density throughout and no attempt has been made to vary the density in different parts of the core or to so vary it as to make the installation of the core easier or to prevent the disintegration of the core in use.

A core of the form described has a cross-section which is roughly cylindrical but especially shaped to properly fit within, fill the casing and require the desired pressure to properly install same. Having a V-shaped groove or slot in its inner side and which extends circumferentially around the filler when installed, the filler when produced is roughly of a horse shoe form of cross-section, having a body portion extending from about the center of the core to the outer periphery and two separated parts or wings extending inwardly from the main body. These wing parts are formed spread more or less apart and are adapted to be pressed tightly together and together with the body portion compressed more or less when the core is installed within a casing.

It is intended that the casing shall be held distended by the filler under such a pressure as to best simulate the usual pneumatic tube so as to prevent too great distortion of the casing or the tire as a whole when subjected to the load in use. Also it has been found that the installation of a filler in a casing and the mounting of the filled casing on a suitable rim are not particularly easy operations.

My present invention relates particularly to a construction of core which will be easier to apply than the cores heretofore made and which will absorb the applied load within its capacity without producing disintegrating movements or pressures within the core.

My invention consists of a core or filler of the character described in which there is a variation of the density or porosity of the core, the body portion being more dense or harder than the wing portions. Another feature is that the inner edges of the wing portions are the softest portions and that the wing portions increase in density toward the body portion.

Such cores or fillers are produced by means of a ring mold of the shape and size desired. In this mold is placed a suitable quantity of raw rubber prepared for vulcanizing. This raw rubber has impregnated therein a suitable proportion of carbonate of ammonia or other suitable chemical for producing the porosity of the core. The prepared rubber is first roughly rolled out to the shape of the mold. It is then enclosed in the mold and the mold is heated to a vulcanizing temperature. The heat is transmitted through the walls of the mold, which is usually made of cast iron, to the mass of rubber within the mold. The heating produces a gas from the carbonate of ammonia which forms cells within the rubber causing the rubber to completely fill the mold, the heat also causing the vulcanization of the rubber in its expanded condition, viz, full of small gas cells, thus producing the spongy core or filler desired. By allowing space within the mold for one part of the mass of rubber to expand more than another, I am enabled to modify or vary the density of the completed core.

For the purpose of making the inner edges of the wing portions of the filler softer than the body portion the mass of raw rubber is formed roughly into the cross-sectional shape of the mold but with the wing portions somewhat shorter or less full than to completely fill the wing portions of the mold. In other words voids or unfilled spaces are left in the mold into which the rubber can be expanded when the carbonate of ammonia forms the gas cells. Consequently in these portions of the core the gas cells are larger than in the body portion; in other words the density is less and these portions are relatively softer.

Another feature relates to the prevention of destructive relative movements of the parts of the filler under the swaying or sidewise action of the tire when in use. For this purpose I make the radial groove or slot, which forms the two wings, with a relatively wide inner or bottom portion so that when the filler is properly mounted in a casing the inner portions of the walls of the slot, which are subject to more or less relative movement in the swaying or sidewise distortion of the tire, do not contact with each other, and consequently are not subjected to destructive disintegrating relative movement.

My invention will be more readily understood by reference to the accompanying drawings in which I have illustrated the improved method of manufacture and the improved filler which is the product of the method.

In said drawings:—

Fig. 1, is a cross-sectional view of a tire casing and rim with one of my improved fillers installed;

Fig. 2, is a view similar to Fig. 1, illustrating the shape, the casing and filler assumes when subjected to a load;

Fig. 3, is a cross-sectional view of the filler itself;

Fig. 4, is an enlarged fragmentary cross sectional view of one of the wing portions of the filler illustrating the internal structure of same; and Fig. 5, is a cross-sectional view of a vulcanizing mold with a core therein which has been vulcanized.

In said drawings 1 illustrates a tire casing such as is commonly used in connection with a pneumatic tube for holding same properly distended. The casing is shown as mounted for use on what is known as a clincher tire rim 2. This rim is adapted to be mounted and held upon a vehicle wheel for use. The rim, as shown, has inturned flanges 3 at its sides and the casing 1 is formed with rim beads 4 at the base of the casing, which are received within the in-turned side flanges of the rim and by which the casing is held upon the rim.

In place of the usual inner tube, which in a pneumatic tire is adapted to hold air under pressure and thereby hold the casing properly distended, I provide a yielding filler 5.

The filler 5 is preferably made of spongy rubber and in the process of manufacture raw rubber is vulcanized to produce the size, shape and form of the filler desired. The filler 5, as shown in Fig. 1, in which the tire is illustrated as ready for use, is compressed to an amount whereby the casing is held distended with sufficient pressure to properly sustain the load without too great distortion of the tire.

Fig. 2, illustrates what may be termed the normal load distortion of the tire.

Fig. 3 shows a cross-sectional view of the filler 5 before it is installed in the casing 1. The filler is roughly of horse-shoe shape having an outer part 6 which extends from about the middle of the filler to the outer periphery and two wing like portions 7 extending from the middle of the filler to the inner periphery. It should be understood that preferably the filler is made in a ring form and of a size to fit the intended casing, also that the cross-sectional area of the filler as shown in Fig. 3, is enough greater than the normal cross-sectional area of the hollow space within the casing 1, that it is necessary to compress the filler in mounting it within the casing and mounting the casing upon the rim. This greater area of the filler is necessary so that the tire will properly sustain the imposed load without a too great initial distortion. The two wing portions 7 are separated by a relatively wide V-shaped groove or slot 8 which extends from the middle part of the filler to the inner periphery and which extends circumferentially around the filler. This slot 8 is preferably fairly wide at its bottom or inner end 9 for a purpose to be described.

As shown in Fig. 1, the filler when installed is somewhat pear shaped the wing portions 7 being pressed tightly together and filling in between the casing beads 4. The casing beads 4 are convex on their inner surfaces as shown at 10 and as they are much harder than the filler they compress the wings into the shape shown. When the filler has been placed in a casing the beads 4 are held spread apart by the wing portions 7 and in mounting the tire on a rim it is necessary to close the beads toward each other. This closing of the casing compresses the filler as a whole but obviously compresses the inner edges 11 of the wing portions 7 more than other parts of the filler.

To permit this compression of the inner edges of the wing portions these parts are made softer than the other parts of the filler. Fig. 4, illustrates the relative density or yieldability of the parts of the filler, the inner edge portions 11 being made with larger gas pockets 12 than the other parts of the filler. As illustrated the density increases from the inner edges of the wing parts 7 toward the center and as shown in Fig. 3, the density of the filler decreases from the middle portion 13 toward the outer periphery.

In manufacturing fillers of the kind described the raw rubber or rubber mixture is first prepared in the usual manner by means of rolls, the mass having mixed therein a suitable proportion of a carbonate preferably carbonate of ammonia which when the mass is heated in the vulcanizing process is turned into gas and being distributed throughout the mass in fine particles each particle forms a gas bubble or cell within the mass. These gas bubbles force the mass to completely fill the mold so that when the filler is completed it has the size, shape and form of the mold within which it is vulcanized.

After the mass has been properly prepared it is forced by great pressure through a die opening of a shape similar to the cross-sectional shape of the finished filler except that as indicated by the dotted lines 14 the inner edges of the wing portions 7 do not completely fill these parts of the mold 15.

The mold 15 is preferably two half rings 16 adapted to be bolted together upon a median plane and the inner part of the mold is made of a ring 17 having an outer circumferential part 18 which is adapted to produce the slot 8 in the filler.

As explained the prepared raw filler is so formed that free spaces 20 are left in the mold into which the inner end portions 11 of the filler can expand in the vulcanizing process. As there is very slight shifting of the body of the material while being vulcanized the result is that the inner parts 11 of the wing portions 7 are more porous or more yielding than the other parts of the filler.

As the heat is applied to the filler through the walls of the mold the heat reaches the outer parts of the mass first and acts upon the carbonate slightly in advance of acting upon the carbonate further within the mass with the result that the outer portions of the filler are softer than the center portions. This latter holds true except that the ring 17 carries the heat quickly into the center of the mass with the result that surrounding the part 18 of the ring is a section or layer of the filler which is more yielding than the main body portion.

As shown in Fig. 1, when the filler is installed for use the whole filler is compressed and the wings 7 are forced tightly together except at the inner end 9 of the slot 8, which has been purposely made wide to prevent close contact at this point. The inner edges 11 of the wings 7 being relatively soft permit them to be readily compressed and distorted as indicated in Fig. 1.

In use under an imposed load as illustrated in Fig. 2, the main body of the filler being relatively harder than the other portions is not distorted to a great extent but is forced bodily inward and at the same time expanded laterally. In this distortion the wing portions 7 are considerably compressed radially and spread out laterally, the inner end 9 of the slot 8 being enlarged as shown and separating the side walls of the slot from the inner end 9 thereof towards the rim. This separation of the side walls of the slot under a working load prevents or eliminates the rubbing of one surface on the other and thus eliminates all destructive abrasion and friction which has been the principal detrimental feature of such fillers heretofore made and used.

The density of the wing portions as indicated gradually increases from their inner edges 11 toward the middle of the filler and likewise the density of the filler itself increases from its outer surface toward the middle portion thereof. This construction results in the softer more compressible inner edges of the wings and also in a relatively softer outer portion in contact with the casing and in condition to best adapt itself to proper contact with the casing.

As many modifications of this invention will readily suggest themselves to one skilled in the art I do not limit my invention to the specific details of the improved method or the structure of the filler except within the scope of the appended claims.

I claim:

1. A spongy rubber filler for use in a tire casing, the filler having a circumferential outer body portion and having a circumferential slot at its inner side dividing the inner part of the filler into two wing-like portions which extend inwardly from the body portion, the body portion being more dense than the wing portions.

2. A spongy rubber filler for use in a tire casing, the filler having a circumferential outer body portion and having a circumferential slot at its inner side dividing the inner part of the filler into two wing-like portions which extend inwardly from the body portion, the wing portions having larger cells than the body portion and which cells increase in size toward the tips of the wing-like portions.

3. A spongy rubber filler for use in a tire casing, the filler having a circumferential slot extending from its inner side to substantially the circumferential center line of the filler and dividing the inner part of the filler into two wing-like portions, the inner edge parts of the wing portions having relatively large cells and consequently being relatively soft, the wings increasing in density toward the body portion and the body portion being more dense than the wing portions.

In testimony whereof, I have hereunto set my hand, this 11th day of September, 1926.

JAMES H. DALBEY.